March 22, 1927.

J. C. LOWE 1,621,939

METER READING APPARATUS

Filed Feb. 21, 1925

Inventor

JOHN C. LOWE,

By Jerry G. Mathews

Attorney

March 22, 1927.

J. C. LOWE 1,621,939

METER READING APPARATUS

Filed Feb. 21, 1925  3 Sheets-Sheet 2

Inventor
JOHN C. LOWE,
By *Jerry A Mathews*
Attorney

March 22, 1927. 1,621,939
J. C. LOWE
METER READING APPARATUS
Filed Feb. 21, 1925   3 Sheets-Sheet 3
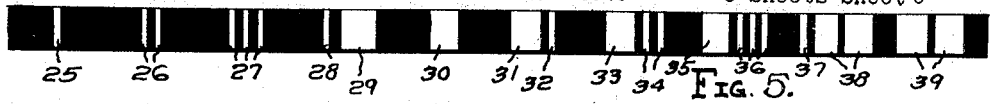
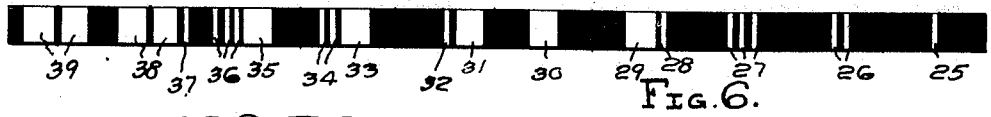
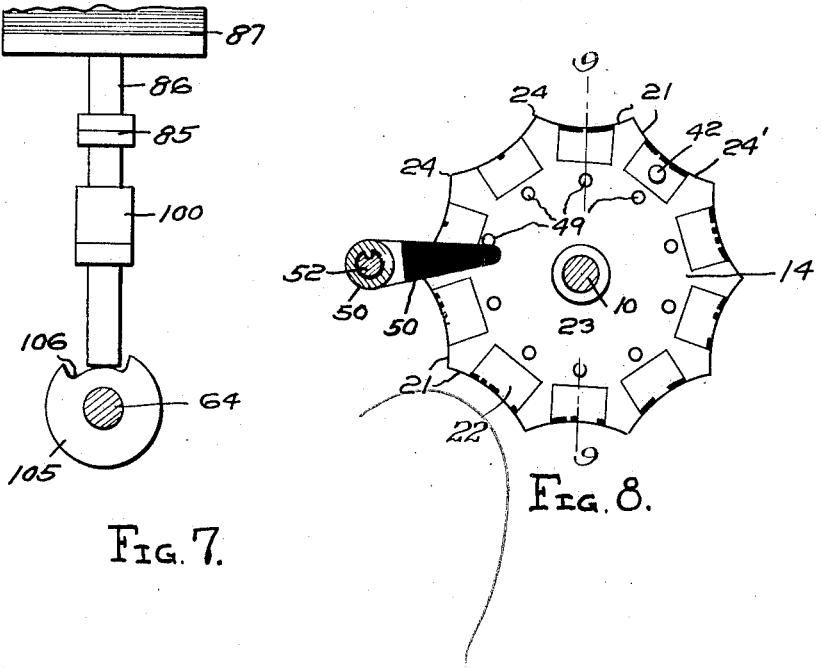
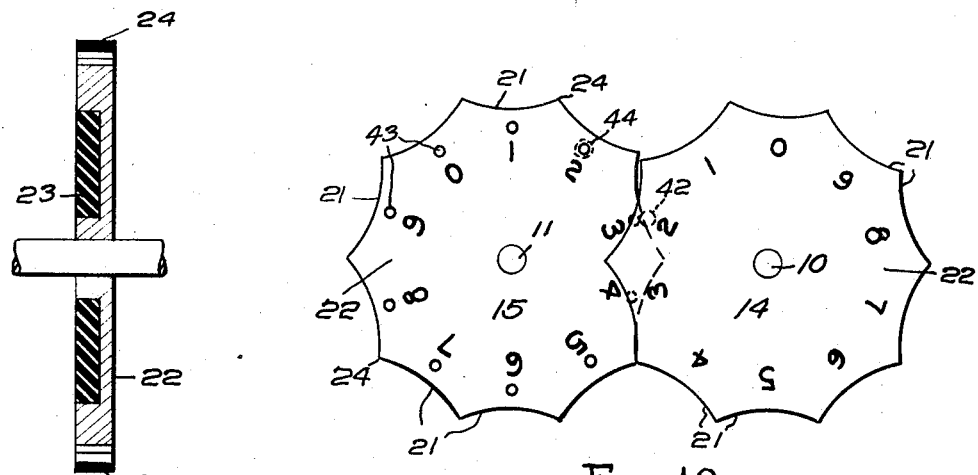
Inventor
JOHN C. LOWE,
By *Jerry A Mathews*
Attorney Patented Mar. 22, 1927.

1,621,939

UNITED STATES PATENT OFFICE.

JOHN C. LOWE, OF MINOT, NORTH DAKOTA.

METER-READING APPARATUS.

Application filed February 21, 1925. Serial No. 10,959.

My invention relates to means for reading meters from a remote point, such as from the home office.

The invention consists broadly in the provision of means for producing signals, preferably audible, although visual signals might also be employed, corresponding to the positions of the several rotatable elements or registering dials of the meter, thereby enabling the reader at a remote point, such as at the home office, to determine the relative positions of the rotatable elements or registering dials and hence ascertain the reading of the meter.

The invention may be used in connection with electric meters and also with fluid meters, such as gas meters, steam meters, water meters, oil meters, or the like.

In the accompanying drawings forming a part of this specification, and in which like numerals are employed to designate like parts throughout the same, Figure 1 is a side elevation, partly diagrammatic, of the apparatus embodying my invention, Figure 2 is a plan view of the apparatus embodied in the invention, Figure 3 is a side elevation of the units registering dial and associated lock member and contact, Figure 4 is a plan view of the units registering dial, Figure 5 is a development of the contact units upon the periphery of the units and hundreds dials, Figure 6 is a similar view, showing the contact units of the tens and thousands dials.

Figure 7 is an end elevation of the supporting wheel for the solenoid core,

Figure 8 is a rear side elevation of the units dial and associated elements,

Figure 9 is a transverse section taken on line 9—9 of Figure 8,

Figure 10, is a side elevation, partly diagrammatic, of the units and tens dials, showing the relation of the various parts.

Figure 1:
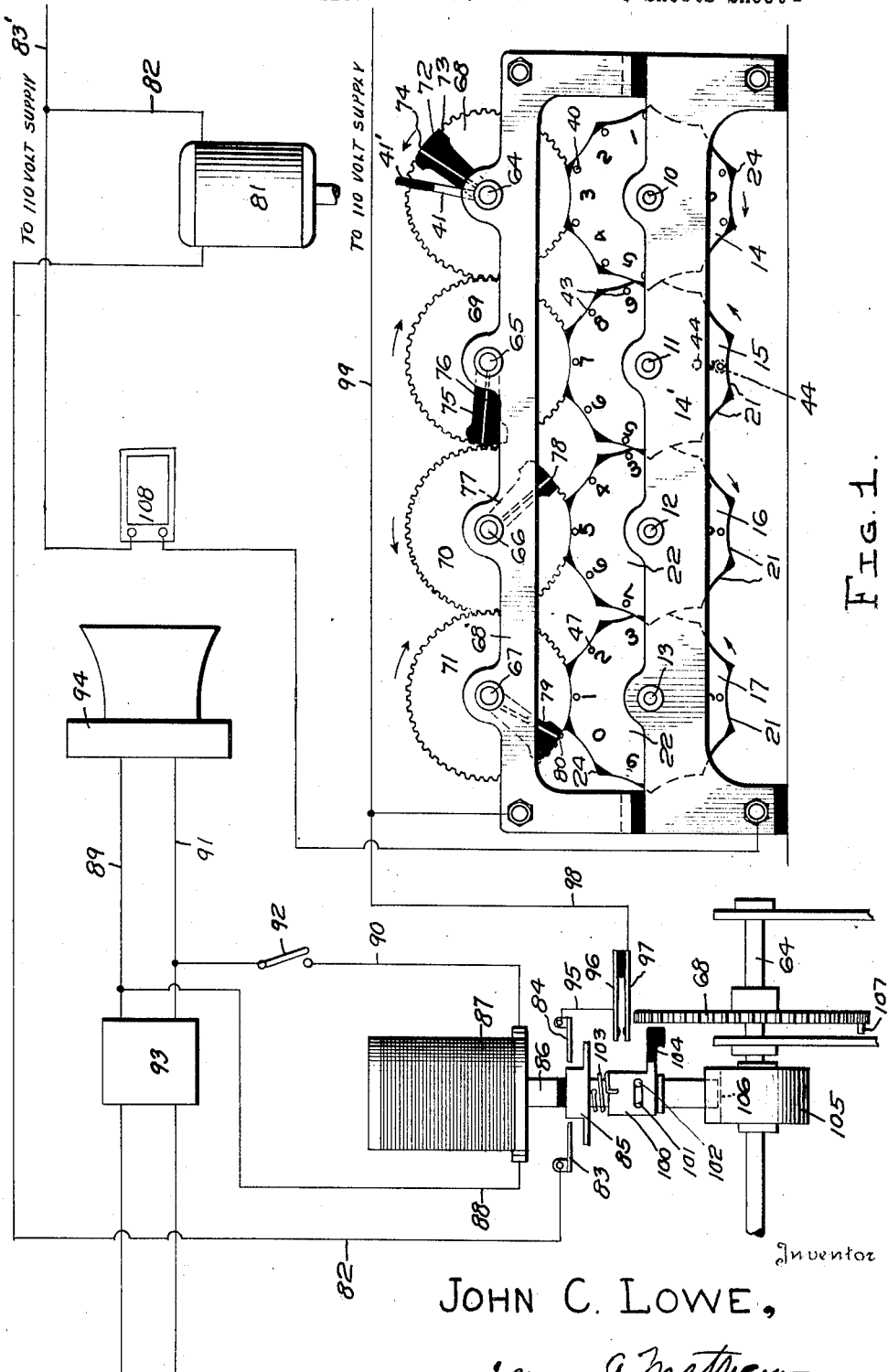

In the drawings, wherein for the puropse of illustration is shown a preferred embodiment of my invention, the numerals 10, 11, 12 and 13 designate transverse, rotatable shafts, suitably journaled in the plates 14' of a frame. These shafts have electrical connection with this frame and are hence grounded to the same, while the frame is thoroughly electrically insulated from all other parts of the apparatus. Arranged upon the shaft 10 is a units rotatable element or dial 14; upon the shaft 11 is a rotatable tens dial 15; upon the shaft 12 is a rotatable hundreds dial 16; and upon the shaft 13 is a rotatable thousands dial 17. The rotatable registering dials 15, 16 and 17 are rigidly mounted upon their shafts. The dial 14 is mounted upon its shaft in a manner to partake of restricted lost motion and, to obtain this, the dial is equipped with a collar 18, which is rotatable upon the shaft 10. This collar has an elongated circumferentially extending slot 19, receiving a pin 20, which is rigid upon the shaft 13. This pin is normally in the leading end of the slot, and hence when the shaft 10 is turning in its operative direction, it will advance the registering dial 14, as if it were rigidly secured thereto. However, the connection is such that it will permit of the dial 14 being turned slightly in the advancing direction, with respect to its shaft, as will be explained. The slot 19 is of such a length that it will permit the dial 14 being turned with respect to its shaft for at least one-tenth of a revolution.

The registering dials are provided upon their peripheries with curved or convex recesses or pockets 21. There are ten of these recesses for each dial and the recesses are of the same length, and they are concentric with rotatable contact elements, to be described, when each recess is shifted to the uppermost position. The registering dials are provided upon their outer faces with numerals or characters, ranging from zero to nine in consecutive order, with respect to the direction of rotation of the dials. These numerals are positioned in the center of the recesses 21, as shown.

Each registering dial is preferably formed of a metallic disk 22, such as brass or the like, having one face recessed for receiving an insulating disk 23, formed of fiber or the like. The insulating disk extends through the periphery of the dial, in the form of insulating points 24, at the ends of the recesses. The intermediate or depressed portion of the recess is formed by the metallic disk 22 and insulating material covering the same. The recess 22 adjacent "1" upon the dials 14 and 16 is provided with one narrow outwardly projecting contact 25; the recess adjacent "2" is provided with two narrow contacts 26; the recess adjacent "3" is provided with three narrow contacts 27; the recess adjacent "4" is provided with a narrow contact 28 and a long contact 29; the recess adjacent "5" is provided with a long contact 30; the recess adjacent "6" is provided with a long contact 31 and a narrow contact 32; the recess adjacent "7" is provided with a long contact 33 and two narrow contacts 34; the recess adjacent "8" is provided with a long contact 35 and three narrow contacts 36; the recess adjacent "9" is provided with a narrow contact 37 and two long contacts 38; and the recess adjacent "0" is provided with two long contacts 39. In this system of contacts, the short contact or dot is employed to indicate I, one long contact employed to designate V, and two long contacts or dashes are employed to designate X, all of the Roman numerals.. It is thus seen that these several arrangements of contacts will produce signals indicating, in the Roman numerals, one to ten, or naught, inclusive. The arrangement of the contact units for the dials 14 and 16 is illustrated in Figure 5 and it is obvious that the dials 15 and 17 are provided with similar contact units, but their order of arrangement is reversed, as the co-acting contact elements rotate in opposite directions. The arrangement of the contact units for dials 15 and 17 is shown in Figure 6.

Figure 2:
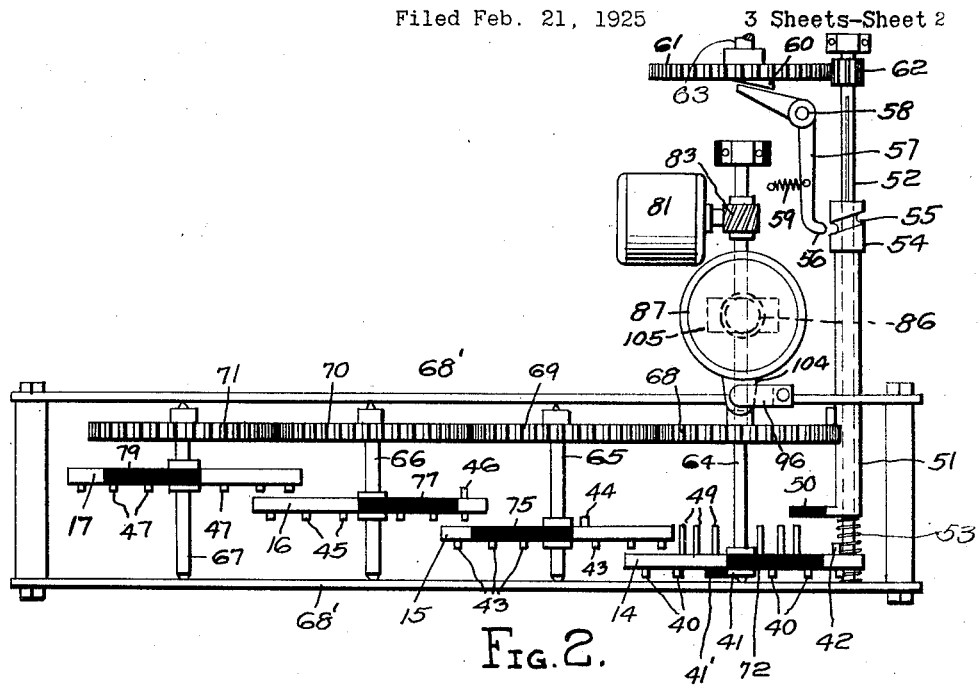
Figure 3:
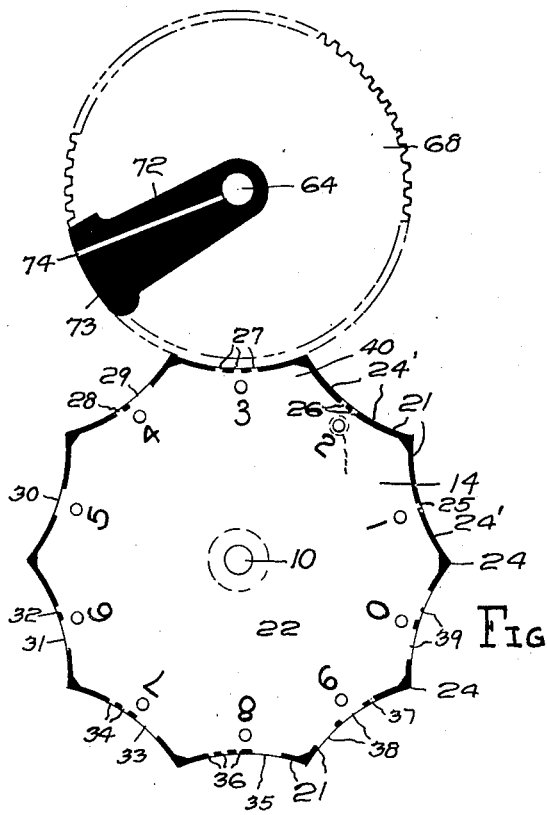
Figure 4:
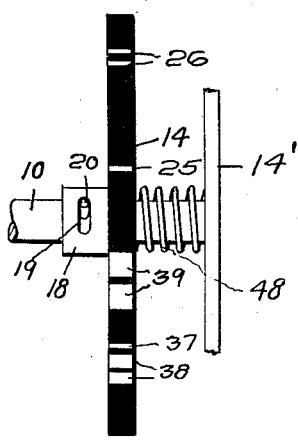

The registering dial 14 is provided upon its outer face with pins 40, arranged at the crests or peaks of the recesses 21, and corresponding in number thereto. These pins are to be engaged by an advancing finger 41, to be more fully described. The registering dial 14 is provided upon its inner face, adjacent the numeral "2", with an advancing pin 42, adapted to successively engage with pins 43, arranged upon the front face of the tens registering dial 15, adjacent to the center of the recesses 21. There are ten of these pins 43. The registering dial 15 is provided adjacent the "2" with an advancing pin 44, to successively engage with pins 45, carried upon the outer face of the dial 16, and corresponding in number and arrangement to the recesses or pockets 21. The dial 16 is provided upon its inner face with an advancing pin 46, Figure 2 adjacent to its "2" to successively engage with pins 47, carried by the thousands dial 17, adjacent to its recesses, and corresponding in number and arrangement thereto. In view of the foregoing description, it will be seen that when the dial 14 has made a complete rotation, the succeeding dial 15 will be advanced one step or one-tenth of a revolution; when the dial 15 has made a complete revolution, the succeeding dial 16 will be advanced one step or one-tenth of a revolution; and when the dial 16 has made a complete revolution, the succeeding dial 17 will be advanced one step or one-tenth of a revolution. In order that the registering dials may not partake of improper turning movement, due to jars or the like, I mount a suitably stiff compressible coil spring 48 upon the shaft of each dial, which frictionally engages with the frame plate and with the dial adjacent its center. The strength of this spring must be properly adjusted so that it will prevent accidental turning of the registering dial, but will not unduly retard its rotation, when driven by the meter.

The units dial 14, is provided upon its rear face with advancing or feeding pins 49, corresponding in number to the recesses 21, and arranged at the center or depressed portions thereof. These pins 49 extend inwardly beyond the pin 42, so that their ends are arranged in a vertical plane outwardly of the pin 42. The pins 49 are adapted to be successively engaged by an insulating feeding finger 50, extending radially from a sleeve 51, and rigidly secured thereto. This sleeve is splined upon a rotatable shaft 52, and the sleeve 51 is shifted rearwardly by a compressible coil spring 53. The sleeve 51 is provided at its rear end with a collar 54, having a cam groove 55 formed therein, adapted for the reception of the end 56 of a bell-crank lever 57 pivoted at 58. The bell-crank lever is moved in one direction by a spring 59. One arm of the bell-crank lever is disposed in the path of travel of an inclined trip 60, rigidly mounted upon a gear 61, engaging a gear 62, which is rigidly mounted upon the shaft 52. The ratio between the gears 62 and 61 is one to ten. The gear 61 is rigidly attached to a shaft 63, which is driven by the movable element of the meter.

Arranged above the registering dials and their shafts, are horizontal shafts 64, 65, 66 and 67, journaled within the side plates 68' of the metallic frame. These shafts have electrical connection with this frame and the frame is thoroughly insulated from all other parts of the device. Rigidly mounted upon the shafts 64 to 67 inclusive are gears 68, 69, 70 and 71, which are in permanent mesh, as shown. The shaft 64 carries a radial locking arm 72, formed of insulating material, and provided at its outer side with an enlarged segmental head 73, having an outer curved face corresponding to the curvature of each recess 21. When the head 73 is traveling over the face 21, in substantially slidable contact therewith, it locks the dial against turning movement, as is obvious. The radial arm 72 carries a metallic contact element 74, suitably embedded therein and this contact element has its outer end adapted for engagement with the contact dots and dashes of the dial, while its inner end is in electrical connection with its shaft and the frame. The shaft 65 carries a similar locking arm 75 and contact 76; the shaft 66 a similar locking arm 77, and contact 78; and the shaft 67 a similar locking arm 79 and contact 80, for co-action with the corresponding registering dials, as shown. These locking arms are arranged above the corresponding dials, in the planes of rotation thereof, and the outer end of each locking arm is adapted to travel through the curved recess in the corresponding dial, when this recess is in the proper elevated position. The relative angular positions of the locking arms 72, 75, 77, and 79 is such that the locking arm 72 is first moved through the recess 21 of the dial 14 and the remaining locking arms are successively moved through the recesses of their corresponding dials.

The advancing finger 41, above referred to, has an insulated extension 41′, adapted to engage with the pins 40 of the units dial 14. The arm 41 is arranged suitably in advance of the radial arm 72, and the function of this arrangement is to provide means whereby the units dial will be located in a position whereby the uppermost recess 21 will be horizontal, when the segmental head 73 travels through the recess. Otherwise, there would be a tendency for a locking action, under certain conditions. Of course, if the recess 21 is horizontal, the arm 41 will clear the pin 40.

The shaft 64 is driven by a small motor 81, through the medium of suitable reducing gears 83, so that such shaft 64 will make a complete revolution in about twenty seconds, although this time might be varied. The motor 81 is connected in the wire 82, which is connected with one side 83′ of the line of 110 volt current. The wire 82 extends to a stationary resilient contact 83, having a companion stationary resilient contact 84, arranged near the same. A movable bridge contact 85 is adapted to ascend and engage the two contacts 83 and 84, thus electrically connecting them. The contact 85 is rigidly secured to the movable core 86 of a solenoid, and is insulated therefrom. This core is adapted to be drawn upwardly into the field or winding 87 of the solenoid, one end of which is connected with a wire 88, which is connected to one side 89 of the telephone line, while the opposite end of the winding is connected with a wire 90, electrically connected with one side 91 of the telephone line. A switch 92 is connected in the wire 90. The telephone line has the usual telephone 83, found in residences, connected therein in the usual manner, while a telephone transmitter 94 may be connected in this telephone line, as an extension line. The solenoid winding 87 is thus connected in multiple with the talking circuit of the telephone line, and receives current therefrom, when the talking circuit is closed, and when the switch 92 is closed. This current is sufficient to energize the solenoid winding and cause the same to draw the core 86 therein. The contact 84 has connection with a wire 95, electrically connected with a resilient contact 96, normally disengaging a co-acting resilient contact 97, which is connected with a wire 98, connected with the other side 99 of the 110 volt line. A collar 100 is slidably mounted upon the lower end of the core 86, and is provided with a slot 101, for the reception of a pin 102. A torsional coil spring 103 serves to turn the collar 100 in one direction, so that the forward end of the slot will engage the pin 102. The collar carries a laterally extending finger 104, normally disposed in the path of travel of the lower spring contact 97. When the core 86 advances so that the contacts 83 and 84 are placed in electrical connection, the finger 104 will engage the contact 97, thus bringing it into engagement with the contact 96, and further closing the circuit at that point. The motor circuit will remain closed for substantially twenty seconds, so that the shaft 64 will complete its rotation. The shaft 64 carries a supporting wheel 105, rigid thereon, which is adapted to engage beneath the lower end of the core 86, and thus hold the same in the elevated position, until the shaft 64 has completed its rotation. The circuit for the motor 81 will remain closed, at the contacts 83 and 84, and also at 96 and 97, when the motor is started, until the rotation of the shaft 65 has been completed. After this rotation has been completed, the lower end of the core is adapted to drop into a recess 106, formed in the periphery of the supporting wheel 105, by gravity. Attention is called to the fact that the recess 106 is slightly wider than the lower end of the core, and this will permit of the shaft 64 and its motor, running by inertia, for a few seconds, after the motor circuit has been opened. However, when the end wall of the slot 106 contacts with the core, the action of the motor is arrested. In order that the motor circuit may be opened, upon the completion of the revolution of the shaft 64, I have equipped the gear 68 with a trip pin 107, which travels in the path of the arm 104, when this arm is in the elevated position, but will clear it when the arm 104 is lowered. Thus, should the solenoid 87 remain energized for a longer period than about twenty seconds, when the rotation of the shaft 64 is completed, the arm 104 being elevated, the pin 107 will engage it and shift the same laterally, tripping it from beneath the spring contact 97, which will allow this spring contact to move away from the spring contact 96, thus opening the motor circuit, and stop the motor. This is to prevent the repetition of the operation of the machine indefinitely. When the switch 92 is opened, the solenoid becomes de-energized, and the arm 104 will descend, and the spring 103 will quickly shift this arm back into the normal position, in alignment with the contact 97, so that the arm may again elevate this contact, upon the next operation. Attention is also called to the fact that when the arm 104 is thus lowered and restored to its normal position, the pin 107 and the arm 104 will thus disengage, whereby the spring 103 will return the arm to the normal position, in alignment with the contact 97. The frame carrying the shafts 64 to 67 inclusive is electrically connected with the side 99 of the 110 volt line, and the frame carrying the shafts 10 to 13 inclusive is electrically connected with the side 83 of this line. A buzzer 108 is connected in the wire 83, and is positioned near the transmitter 94.

The operation of the apparatus is as follows:

The operator or reader, at headquarters, such as at the electric light office, calls the residence telephone 93, in the usual manner, telling the resident that it is desired to read the meter, and requesting that the switch 92 be closed. When this is done, the solenoid circuit is closed and the solenoid energized and the core 86 raised, whereby the motor circuit will be closed at the contacts 83, 84, 96 and 97, as described. The motor 81 will then be set into action and the shaft 64 rotated, and the supporting wheel 105 will instantly have its periphery engaging beneath the lower end of the core 86, thus rendering it impossible to open the motor circuit, until the shaft 64 has made a complete revolution. The motor circuit will be automatically opened, at the end of this complete revolution of the shaft 64, even though the switch 92 remains closed for a longer period than about twenty seconds, as the pin 107 will shift the arm 104 laterally to bring this arm from beneath the contact 97, thus allowing the contacts 96 and 97 to separate. Now, when the solenoid circuit is subsequently opened, the core 86 will descend, and the arm 104 will disengage the pin 107 and spring back to the normal position, as described. When the shaft 64 of the motor 81 is rotating, as above described, the trip arm 41 first passes in proximity to the registering dial 68, and if the uppermost recess is not horizontal, this trip arm will engage with the proper pin 49, and advance the dial 14 sufficiently, without rotating the shaft upon which the dial is mounted, to cause the uppermost recess 21 to assume the horizontal position. This turning movement of the dial by the arm 41 may be a part or almost all of one-tenth of a revolution. In other words, the arm 41 will function so that an uppermost recess 21 will be presented in a horizontal position. If the uppermost recess is already horizontal, the arm 41 will clear the pin and the dial 14 will not be advanced.

The locking arm 72 traveling with and behind the arm 41 now has its segmental head 73 brought across the pocket, and during this travel it will lock the dial against rotation, until it clears the pocket. During this travel of the locking arm 72, the contact 74 will engage with the contact dots or dashes in the pocket or recess, as the case may be, and the buzzer 108 will be sounded, indicating dots or dashes, as they occur in the recess or pocket. This sound is transmitted to the office or station through the telephone circuit leading to the transmitter 94. In a similar manner, when the other locking arms and contacts are brought across the uppermost recesses or pockets of the succeeding registering dials, the buzzer will be sounded, for each succeeding dial, in accordance with the character of the contact dots or dashes, thus producing an audible signal for each succeeding dial. The operator at the office thus makes a memorandum of the audible signals transmitted for each of the registering dials, in proper order, and by this means positions of all of the dials are clearly ascertained. As soon as the last dial has been read and the contact 80 has cleared the last dial, the pin 107 engages with the arm 104, opening the motor circuit and the mechanism stops, with all of the registering arms out of contact with the dials.

As it is desirable to require the registering dial 14 to be progressed by the arm 41 no oftener than absolutely necessary in the operation of the reading, the sleeve 51 and associated elements is provided, so that the dial 14 shall not start to move from its readable position until approximately nine-tenths of a kilowatt has been consumed. This results in a much more rapid movement of the dial 14 from one horizontal position to the next. The shaft 52 is continuously rotated, and the sleeve 51 rotates with it. The spring 53 normally retains the sleeve 51 in the rear position, and the finger 50 therefore clears the pins 49. When the gear 61 approaches the end of a complete rotation, the trip 60 swings the bell-crank lever 57 upon its pivot and the end 56 enters the cam groove 55, and the sleeve 51 is shifted forwardly. The finger 50 will now be arranged to engage the adjacent pin 49, and the dial 14 will be advanced a step. As soon as the trip 60 passes from beneath the bell-crank lever 57, the spring 59 turns this lever upon its pivot, and the point 56 will be withdrawn from the cam groove 55, and the sleeve 51 will be returned to the rear position.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention I claim:

1. In apparatus of the character described, counting mechanism embodying a plurality of rotatable dials, each dial being provided upon its periphery with recesses, different contact units arranged within the recesses and adapted to produce a different signal for each recess, rotatable locking members arranged near the dials and corresponding in number with relation thereto, said locking members being adapted to pass through the recesses of the dials and to hold the dials against turning movement during such passage, contact elements carried by the locking members for co-action with the contact units, circuit means associated with the contact elements and contact units, and means to drive the locking members.

2. In apparatus of the character described, counting mechanism embodying a plurality of rotatable dials driven by a meter, each dial being provided upon its periphery with recesses, different contact units arranged within the recesses and adapted to produce a signal of different character for each recess, rotatable contact elements arranged near the dials and corresponding in number with relation thereto and adapted to engage with said contact units when passing through the said recesses, means to drive the contact elements, means to hold the dials against turning movement while the contact elements are passing through said recesses, and circuit means associated with the contact elements and contact units.

3. In apparatus of the character described, counting mechanism embodying a plurality of registering dials, each dial being provided upon its periphery with curved recesses, different contact units held within the recesses and adapted to produce a different signal for each recess, rotatable locking members geared together and having curved ends adapted to travel through the curved recesses when substantially concentric with relation thereto thereby holding the dials against turning movement while passing through said recesses, contact elements carried by the locking members to engage with the contact units, means to rotate the locking members in proper order, and circuit means associated with the contact elements and contact units.

4. In apparatus of the character described, counting mechanism, signal producing means associated with the counting mechanism and embodying rotatable members, means including a motor to drive the rotatable members, a motor circuit connected with the motor, a switch to open and close the motor circuit at one point, a second switch in series with the first named switch to open and close the motor circuit at another point, electrically operated means adapted when energized to close both switches whereby the motor circuit is closed at both points and the motor started, and means driven by the motor to open the second named switch so that the motor circuit is open and the motor stopped even if the electrically operated means remains energized.

5. In apparatus of the character described, counting mechanism to be driven by a meter and embodying a plurality of registering dials, each dial being provided upon its periphery with curved recesses, different contact units carried by each dial in spaced relation, each contact unit being adapted to produce a different signal, a plurality of rotatable locking members rotatably mounted near the dials and having their ends curved so that they are adapted to pass through the recesses, means to drive the rotatable members, contact elements carried by the rotatable members for co-action with the contact units, circuit means associated with the contact units and contact elements, and an advancing element rotatable with one of the rotatable locking members to advance the first dial so that its upper recess will be in the proper position for receiving the curved end of said member.

6. In apparatus of the character described, counting mechanism embodying a plurality of rotatable registering dials, one dial having a plurality of projections, a rotatable shaft, means to drive the shaft through a plurality of rotations for each rotation of the driving means, a sleeve splined upon the shaft and having a swinging finger to successively engage the projections, means automatically operated by the driving means during a portion of a revolution of said driving means to shift the sleeve longitudinally upon its shaft, and electric signalling means associated with the dials for indicating their relative positions.

7. In apparatus of the character described, counting mechanism embodying a plurality of rotatable members, means whereby the members may be driven from a meter, electrical means for producing signals indicating the relative positions of the rotatable members, a motor to actuate the electrical means, a motor circuit connected with the motor, a solenoid embodying a winding and core, a switch connected in the motor circuit and having a part moved by the core, a second switch connected in the motor circuit in series with the first named switch, an arm mounted to turn upon the core and to move longitudinally therewith and adapted to close the second switch when the solenoid is energized, means operated by the motor to turn the arm upon the core for disengaging the same from the second switch to open such second switch, and a supporting element driven by the motor and engaging beneath the core and having a recess into which the core may descend.

8. The combination with a plurality of rotary counters having means whereby the total of one counter is transferred to the next succeeding counter, each counter having different contact units at spaced intervals thereon for producing different signals thereby indicating the position of the counter, a corresponding number of rotatable contact elements arranged near the counters and having relative radial positions with relation thereto so that they engage the contact units of the counters in succession, said contact elements being rotatable independently of the counters, means to connect the contact elements together so that they rotate and retain the relative radial positions, and a common signal circuit having one side connected with the contact units of the counters and the opposite side connected with the contact elements.

9. The combination with a plurality of rotatable counters having means whereby the total of one counter is transferred to the next succeeding counter, each counter having spaced different contact units producing different signals at different points thereby indicating the position of the counter, a corresponding number of rotatable contact elements arranged near the counters and having relative radial positions with relation thereto so that they engage the adjacent contact units of the counters in succession, means to connect the contact elements together so that they rotate and retain the relative radial positions, means for holding each rotary counter against movement while the contact element is passing over the contact unit thereof, and signal circuit means associated with the contact units of the counters and the contact elements.

In testimony whereof I affix my signature.

JOHN C. LOWE.